United States Patent
Benson et al.

(10) Patent No.: US 6,202,085 B1
(45) Date of Patent: *Mar. 13, 2001

(54) SYSTEM AND METHOD FOR INCREMENTAL CHANGE SYNCHRONIZATION BETWEEN MULTIPLE COPIES OF DATA

(75) Inventors: Max L. Benson; Dinarte Morais, both of Redmond; Scott Norin, Newcastle; William P. Champion; Thomas F. Fakes, both of Redmond; Milind M. Joshi, Belleview, all of WA (US)

(73) Assignee: Microsoft Corportion, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/758,739

(22) Filed: Dec. 6, 1996

(51) Int. Cl.[7] ........................................................ G06F 9/46
(52) U.S. Cl. ........................ 709/205; 709/202; 709/318
(58) Field of Search ........................ 395/200.35, 200.31; 709/310, 201, 205, 202, 318

(56) References Cited

U.S. PATENT DOCUMENTS

| | | | |
|---|---|---|---|
| 5,600,834 | * | 2/1997 | Howard .................................. 395/617 |
| 5,737,601 | * | 4/1998 | Jain et al. ......................... 395/200.31 |
| 5,790,789 | * | 8/1998 | Suarez .............................. 395/200.32 |

OTHER PUBLICATIONS

Martin, James, Design and Strategy for Distributed Data Processing, Prentice Hall, Inc., pp. 272–306, 1981.*

* cited by examiner

Primary Examiner—Zarni Maung
Assistant Examiner—Gary Scott Fourson
(74) Attorney, Agent, or Firm—Workman, Nydegger & Seeley

(57) ABSTRACT

A system and method for incremental change synchronization among multiple copies of data is disclosed. To achieve the synchronization a genera synchronization model is used. The synchronization model establishes a one-way data flow path to allow incremental changes to be transferred from a copy of data that incorporates the incremental changes to a copy of data that does not yet incorporate the incremental changes. To achieve this one-way data flow path, the synchronization model uses an agent, a data collector, and a data synchronizer. The data collector collects incremental changes transferred to it and applies the incremental changes to a copy of data. A data synchronizer transfers incremental changes to a data collector. An agent controls the synchronization process by making a connection between a data collector and a data synchronizer and then directing the data synchronizer to transfer data to the data collector. If bidirectional data flow is necessary to achieve synchronization between two copies of data, a one-way data flow path is established first in one direction and after all incremental changes have been passed in that direction, a data flow path is established in the opposite direction to pass incremental changes in the opposite direction.

18 Claims, 7 Drawing Sheets

SYSTEM AND METHOD FOR INCREMENTAL CHANGE SYNCHRONIZATION BETWEEN MULTIPLE COPIES OF DATA

BACKGROUND OF THE INVENTION

1. The Field of the Invention

The present invention relates to synchronization of multiple copies of data. More specifically, the present invention relates to systems and methods that allow two copies of data to be synchronized so that incremental changes made to one copy of the data can be identified, transferred, and incorporated into the other copy of the data.

2. The Prior State of the Art

Today, business and technology trends are changing the way we use computers and information. The personal computer or PC has become the standard business information tool as prices have decreased and computing power has increased. In record numbers, businesses are reengineering their organizational structure and processes to become faster and more competitive, in addition to being better able to use the wealth of information resources available today. Never before has there been so much information so readily available nor such high expectations for how much the individual will be able to accomplish by utilizing this information. The result is that people today need access to information everywhere, anytime. In June 1994, Microsoft announced a new product designed to meet the these needs called Microsoft® Exchange.

The main concept behind Microsoft® Exchange is to provide a product that integrates E-mail, scheduling, electronic forms, document sharing, and other applications such as customer tracking to make it all together easier to turn information into a business advantage. The result is that users can access, organize, and exchange a world of information, wherever they happen to be in the world--whether from the office, the home, or while traveling on the road. In essence, a main barrier to PC-based communication, namely, accessibility and sharing by multiple parties of up-to-the minute information, has now been significantly reduced.

With the increased accessibility and sharing of information between multiple users, it is now more common than ever for such multiple users to simultaneously or in tandem work on shared data set objects, as for example word processing documents, spread sheets, electronic forms, E-mail messages, graphic images, or a host of other such data objects. With such shared use of data objects among multiple users of a computer network, there arises the need for each user to keep all other users of the same data object or the same set of data objects apprised of changes that are made locally by that user. This need gives rise to a process called replication of data, that is, transferring incremental changes (e.g., creation of new data, modification of existing data, or deletion of existing data) made locally at one server to a specified list of other remote or locally connected servers.

Employing such a replication model, Microsoft® Exchange creates a network or enterprise of remote or locally connected servers having copies of data objects or sets of data objects. Users may then access a copy of one or more of the shared data objects or sets of data objects in order to gain access to desired information. Changes made to one of these data objects will be replicated among all other servers having a copy of the data object so that all information remains current throughout the network or enterprise.

Such a model works extremely well when all members of the network or enterprise use a common replication model. However, many situations arise where it would be desirable to transfer information between systems that do not use a common replication model. For example, it may be desirable to extract information from a Microsoft® Exchange or other replication enterprise and store the extracted information in a format that is very different from that used by the replication enterprise. As an example of a specific application, suppose someone wished to provide an indexing and search engine for all publicly shared objects in a replication enterprise. This would require examining all objects replicated throughout the enterprise and indexing each object so that the information in the object can be quickly accessed. As changes are made to the objects replicated throughout the enterprise, these changes must be provided to the search engine so that it can update its information to incorporate the changes. It would be desirable to allow such an indexing system to synchronize with the replication enterprise to remain current with changes made to data objects. Other systems may have similar needs to place information into a particular replication enterprise.

In other situations, it may be desirable to synchronize information from two different replication enterprises that store the information in different underlying structures. For example, it may be desirable to provide a copy of one or more internet news groups in a replication enterprise. This would involve extracting information from one system (the internet) and placing the information into another system (the replication enterprise). There currently does not exist a generalized synchronization model that allows information stored in different underlying structures to be synchronized so that when a change is made to the data stored on one system, the change can be transferred to the other system. Prior systems often require very specific replication information be maintained by each system. Furthermore, it is a common expectation that record identifiers and change identifiers are of a common format. This requirement makes it difficult to synchronize with different systems.

Another situation where it would be desirable to extract information from a replication enterprise is where a user desires to carry a copy of publicly replicated objects on a mobile system, such as a laptop or other system. While it might be possible to make the laptop an integral member of the replication enterprise, such a solution is generally not preferred since it places an administrative burden on the network administrator. If a laptop or other system is made an integral part of the replication enterprise, then the network administrator must typically set up and administer the system as part of the general replication model. If the system is a mobile system, such as a laptop, which can connect to the replication enterprise in a manner that changes from day-to-day or hour-to-hour, it is generally not feasible to require the network administrator to keep modifying the replication enterprise configuration to accommodate the changing replication topology caused by a system connecting into the replication enterprise in an ever changing fashion. It would be highly desirable to allow such a system to keep a local copy of information replicated throughout an enterprise and yet reduce or remove the administrative burden on a network administrator. Currently, there does not exist a generalized synchronization model that allows such a local copy to be kept while simultaneously reducing or eliminating the network administrative burden.

Some attempts have been made to accommodate synchronization for a mobile system. For example, a simple method using peer to peer replication would be for the connecting system to maintain a time stamp of the last time it connected to the server. When the system connects again, it can ask for all changes that have occurred since the last time it connected. Unfortunately, this simple model does not work well in a replication enterprise where copies of information move from server to server. For example, suppose the system was last connected to the server at 11:30 and is currently connecting to the server at 12:00. The system can ask for all changes that have occurred since 11:30. Suppose the system disconnects at 12:05 and at 12:06 a change is received by the server from the replication enterprise that occurred at 11:45. When the system reconnects to the server, it will ask for changes that occurred after 12:05. The 11:45 change will never be retrieved. Furthermore, many systems using this type of model require connection to the same server each time. It would be highly desirable to allow a mobile system to connect to any server in the replication enterprise and be able to properly receive all required changes to remain current.

Yet another example where it would be desirable to extract information from a replication enterprise is where the incremental changes that are made to the objects replicated throughout the enterprise are to be backed up and saved in a particular location. Such an incremental backup would be desirable if events caused the loss of critical information and it was necessary to rebuild the state of the replication enterprise from a particular point in time. While it may be possible to make such an incremental backup an integral part of the replication enterprise, such an approach can create several problems. For example, if the replication model used by the replication enterprise is highly sophisticated, then any incremental backup that was an integral part of the replication enterprise must implement most, if not all, of the details of the replication model. This typically creates a complex piece of software in a situation where simplicity is preferred. Furthermore, if the incremental backup is stored in a different underlying format than that used by the general replication enterprise, further problems may be created.

It would be highly desirable to handle all of the above-described situations with a generalized synchronization model that allowed changes to be extracted from a replication enterprise or to be placed into a replication enterprise. It would be desirable to incorporate into the model the ability to synchronize data from different systems in different underlying formats. Furthermore, it would be desirable to allow these systems to synchronize information with little or no change to the underlying storage structure.

SUMMARY AND OBJECTS OF THE INVENTION

The foregoing problems in the prior state of the art have been successfully overcome by the present invention, which is directed to a system and method for incremental change synchronization between multiple copies of data. The system and method of the present invention can be used to synchronize data replicated throughout a replication enterprise with data stored on other systems in different underlying formats. For example, the present invention can be used to keep local copies of information replicated throughout the replication enterprise. The present invention may also be used to create an incremental backup of information replicated throughout the enterprise. Finally, the present invention allows synchronization with third-party databases and other organizations where the information and the third-party database or other organization is stored in a different underlying format than that used by the replication enterprise. This synchronization can occur with little or no change to the underlying format used by such a third-party database, incremental backup, or local copy of information replicated in the enterprise. The present invention allows such "synchronization clients" to tap into and synchronize with a replication enterprise. As illustrated by the examples above, a synchronization client can be a mobile system that connects to the replication enterprise intermittently, a different replication enterprise that stores information in a different underlying structure, a database, a folder or directory, or any other system or location that is not an integral part of the replication enterprise.

One property that all the above synchronization clients share is that they are not an integral part of the replication enterprise. This means that they are, to a greater or lesser degree, not set up and administered by the network administrator as part of the replication enterprise. This is perhaps most starkly illustrated by the scenario where the synchronization client is a third-party database or other organization that stores its data in a system or location that is totally outside the responsibility of a particular network administrator. In situations where a user wishes to keep an off-line copy of information that is replicated throughout a replication enterprise, the system may fall into the responsibility area of the network administrator, but the system is not set up and administered as part of the replication enterprise. The synchronization model of the present invention handles the situations described above with little or no administrative burden on the network administrator.

Although the present invention is applicable in any situation where two copies of data need to be synchronized, the specific context of a replication enterprise and a synchronization client will be used as illustrative. The synchronization model of the present invention defines a one-way data flow between a data source and a data recipient to achieve data synchronization between a synchronization client and the replication enterprise. This one-way data flow is created using three functional components. The first component is a data collector. A data collector collects or receives data transferred to it by another component and processes or stores the data appropriately. For example, the data collector may be responsible for receiving incremental changes to a particular copy of data in order to incorporate the incremental changes into the copy of data. As another example, the data collector may receive incremental changes and store the incremental changes unchanged. As a further example, the data collector may receive incremental changes, perform partial processing on the incremental changes, and pass the incremental changes along to another module for further processing or handling.

The next component is a data synchronizer. The data synchronizer is responsible for passing incremental changes to a data collector. The data synchronizer may also perform a wide variety of additional functions, such as identifying which incremental changes need to be passed to the data collector in order to bring the data collector current with the data synchronizer, and provide an updated synchronization state reflecting the incremental changes transferred by the data synchronizer to a data collector.

The final component in the synchronization model is an agent process. The agent directs the entire synchronization process and controls the data synchronizer. The agent also connects a data collector to a data synchronizer so that the data synchronizer can pass information directly to the data collector without passing through the agent. In one embodiment of the present invention, the agent is also responsible for storing a synchronization state reflecting the synchronization state of the data collector. This synchronization state can then be provided to the data synchronizer in order to allow the data synchronizer to discover which incremental changes need to be transferred to the data collector in order to bring the data collector's synchronization state current. The agent can also direct the data synchronizer to update the synchronization state at an appropriate interval.

Although the present invention defines three functional components, multiple functional components may be combined into a single process or software program. The exact physical breakdown is not important to the present invention. Typically, however, the agent process will reside on the synchronization client. For bidirectional data flow between the synchronization client and the replication enterprise, each would implement a data collector and a data synchronizer. If only one-way data flow is required, each would implement the appropriate component.

In operation, the present invention performs as follows. Execution of the agent process is initiated either by a user or by another process. The agent process then makes a connection between a data collector and a data synchronizer so that information can flow from the data collector to the data synchronizer. Although many models may be used to make such a connection, one embodiment of the present invention makes such a connection by first obtaining a data collector interface. The data collector interface is designed to allow data to be transferred to the data collector through the data collector interface. The agent then obtains a data synchronizer interface. The data synchronizer interface allows the agent to control and configure the data synchronizer. The data collector interface is then passed to the data synchronizer to establish a connection between the data synchronizer and the data collector. Once the data synchronizer has the data collector interface, the data synchronizer can use the interface to transfer information to the data collector using an appropriate method.

After such a connection is made, the agent then directs the data synchronizer to "synchronize" with the data synchronizer. The data collector, in response to this direction, transfers at least a portion of the incremental changes to the data collector. A data synchronizer will typically only transfer a portion of the incremental changes to the data collector each time it is directed to synchronize. This allows the agent to track the progress of the synchronization process. This progress can be displayed to a user or provided to another processing module. Passing control back to the agent after a few incremental changes are transferred also allows the agent to "checkpoint" the synchronization process by updating and saving the synchronization state partway through the synchronization procedure. The agent process continues to call synchronize or update synchronization state as appropriate until all incremental changes have been transferred from the data source to the data collector or until the synchronization procedure is terminated either by a user or by another process.

In order to synchronize a synchronization client with a replication enterprise, it may be necessary to first transfer information one-way (e.g., from the replication enterprise to the synchronization client) using the above model, and then transfer information in the reverse direction (e.g., from the synchronization client to the replication enterprise) using the above model. By passing incremental changes first one-way, and then the other way, all changes made either in the replication enterprise or by the synchronization client can be incorporated into the final data object.

Certain embodiments of the present invention allow synchronization to be performed over a transport link, such as an E-mail link or other one-way communication link. In these embodiments, the present synchronization model is extended to include an agent, data synchronizer, and data collector on each side of the transport link. One agent is responsible for directing the overall synchronization process while the other agent is responsible for directing synchronization tasks on its side of the transport link only. Being able to use an E-mail or other one-way transport link to perform synchronization provides a significant advantage in that data synchronization can now occur over an internet E-mail system if desired.

Accordingly, it is a primary object of the present invention to provide a system and method for incremental change synchronization between multiple copies of data. Other objects of the present invention include: providing a system and method for incremental change synchronization that allows synchronization between a replication enterprise and a synchronization client that is not an integral part of the replication enterprise; providing a system and method for incremental change synchronization that allows synchronization between different copies of data stored in different underlying structures; and providing a system and method for incremental change synchronization that provides a general synchronization model adapted to a wide variety of specific applications.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The following invention is described by using flow diagrams to illustrate either the structure or processing of embodiments used to implement the system and method of the present invention. Using the diagrams in this manner to present the invention should not be construed as limiting of its scope. The present invention contemplates both methods and systems for incremental change synchronization between multiple copies of data. Embodiments of the present invention may comprise a special purpose or general purpose computer comprising standard computer hardware such as a central processing unit (CPU) or other processing means for executing computer executable instructions, computer readable media for storing executable instructions, a display or other output means for displaying or outputting information, a keyboard or other input means for inputting information, and so forth.

Embodiments within the scope of the present invention also include computer readable media having executable instructions. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
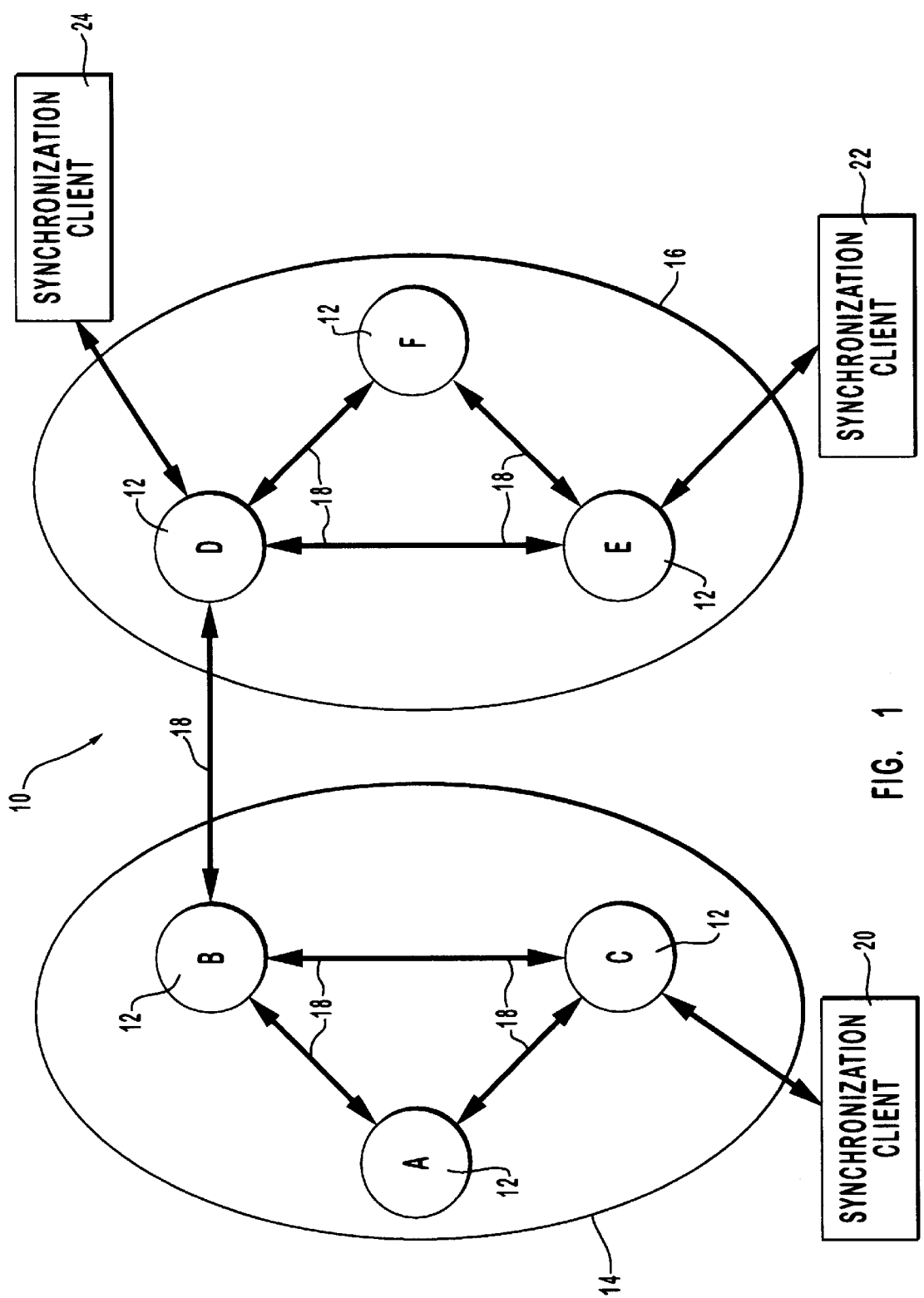
FIG. 1 is a diagram illustrating a generalized replication enterprise with generalized synchronization clients.

Turning now to FIG. 1, an example network over which data can be replicated is shown generally as 10. Such a network may be referred to as a "replication enterprise" or s simply an "enterprise." Replication enterprise 10 represents a generalized replication enterprise. Although the present invention can be used to synchronize copies of data in any context, synchronizing data with a replication enterprise provides a convenient context to illustrate the present invention.

Examples applying the present invention to such a context should be considered only illustrative and not limiting of the scope of this invention. Replication enterprise 10 comprises a plurality of systems which may be referred to as "replica nodes" 12 labeled A–F in FIG. 1. Replica nodes 12 represent a location in replication enterprise 10 where a copy of replicated data may reside. Replica nodes 12 may be any type of general or specialized computer, such as a server, desk top, laptop, or other computers. In general, however, replica nodes 12 typically comprise computers that are relatively stationary so as to maintain a relatively fixed enterprise topology.

In replication enterprise 10, replica nodes 12 may be grouped into "sites." A site is typically a plurality of replica nodes with relatively similar costs to access data. Replica nodes within a site are generally, but not necessarily, located in a relatively localized geographic area and have high speed connectivity between nodes, such as, for example, Local Area Network (LAN) connections. The cost to access data between sites is typically much greater than the cost to access data within a site. Site groupings are typically assigned by a network administrator. FIG. 1 illustrates two sites, designated 14 consisting of replica nodes A, B, and C, and 16 consisting of replica nodes D, E, and F.

Within a replication enterprise, replica nodes are connected by physical network connections. In FIG. 1, the physical network connections 18 are illustrated by solid arrows. Replica nodes 12 may be connected in a variety of network topology configurations. In the enterprise illustrated in FIG. 1, each site is fully connected with a single physical connection between the two sites. The specific type of network topology supported by a particular replication enterprise will be dependent upon the type of replication enterprise used. Although the present invention may be utilized with any replication enterprise, one suitable type of replication enterprise is presented in U.S. Pat. No. 5,812,793 to Shakib et al., 08/673,741 entitled SYSTEM AND METHOD FOR ASYNCHRONOUS STORE AND FORWARD DATA REPLICATION (hereinafter the "Store and Forward Patent"), incorporated herein by reference.

The present invention may be used to synchronize data in a replication enterprise with data in a system that is not an integral part of the replication enterprise. For example, the present invention may be used to synchronize data between a replication enterprise and a third-party database or other replication enterprise. The present invention may also be used to synchronize data between a replication enterprise and a client system such as a laptop or other computer. Furthermore, the present invention may be used to save all changes made to particular objects in the replication enterprise into an incremental backup. In short, the present invention may be used to extract data from, or place data into, a replication enterprise by a system that, for one reason or another, is not an integral part of the replication enterprise. In FIG. 1, systems that are not integral parts of replication enterprise 10 are illustrated by synchronization clients 20, 22, and 24. In the context of this application, a "synchronization client" will be used to refer to a system that desires to synchronize data with the replication enterprise but which is not an integral part of the replication enterprise. The phrase "an integral part" is used to denote systems that, for one reason or another, do not implement the full replication protocol of the replication enterprise and prefer to rely on the simpler synchronization model used in the present invention.

As an example, synchronization client 20 may represent a mobile system such as a laptop that may connect to various points in the replication enterprise depending on where the laptop is located when it is accessing the replication enterprise. For example, FIG. 1 illustrates synchronization client 20 connected to replication node C. If synchronization client 20 is a laptop, then the next time it connects to the replication enterprise, it may connect to a completely different replication node. Requiring such a system to become an integral part of the replication enterprise and to be configured as a standard replication node may create problems in network administration. In many instances, the replication nodes must be aware of the particular network topologies so that messages can be routed to appropriate replica nodes. In other instances, replica nodes are assigned cost functions based on the particular site they belong to. If any aspect of the replica node is dependent upon the network topology as, for example, in the case of routing or assigning cost functions, then making a mobile system an integral part of the replication enterprise may create administrative burdens for the network administrator. It is much more desirable to reduce or eliminate the need for a network administrator to intervene in the enterprise configuration when a mobile system connects to a different replica node.

Similar considerations may be given to other types of synchronization clients. For example, if a synchronization client represents a third-party system or database, the third party may be unwilling to fully disclose all the internal storage or replication details of their system. In these type of situations, a third party may prefer to implement the generalized synchronization model of the present invention which does not require that either the synchronization client or the replication enterprise have complete details of the internal storage of a particular enterprise or database.

Figure 2:
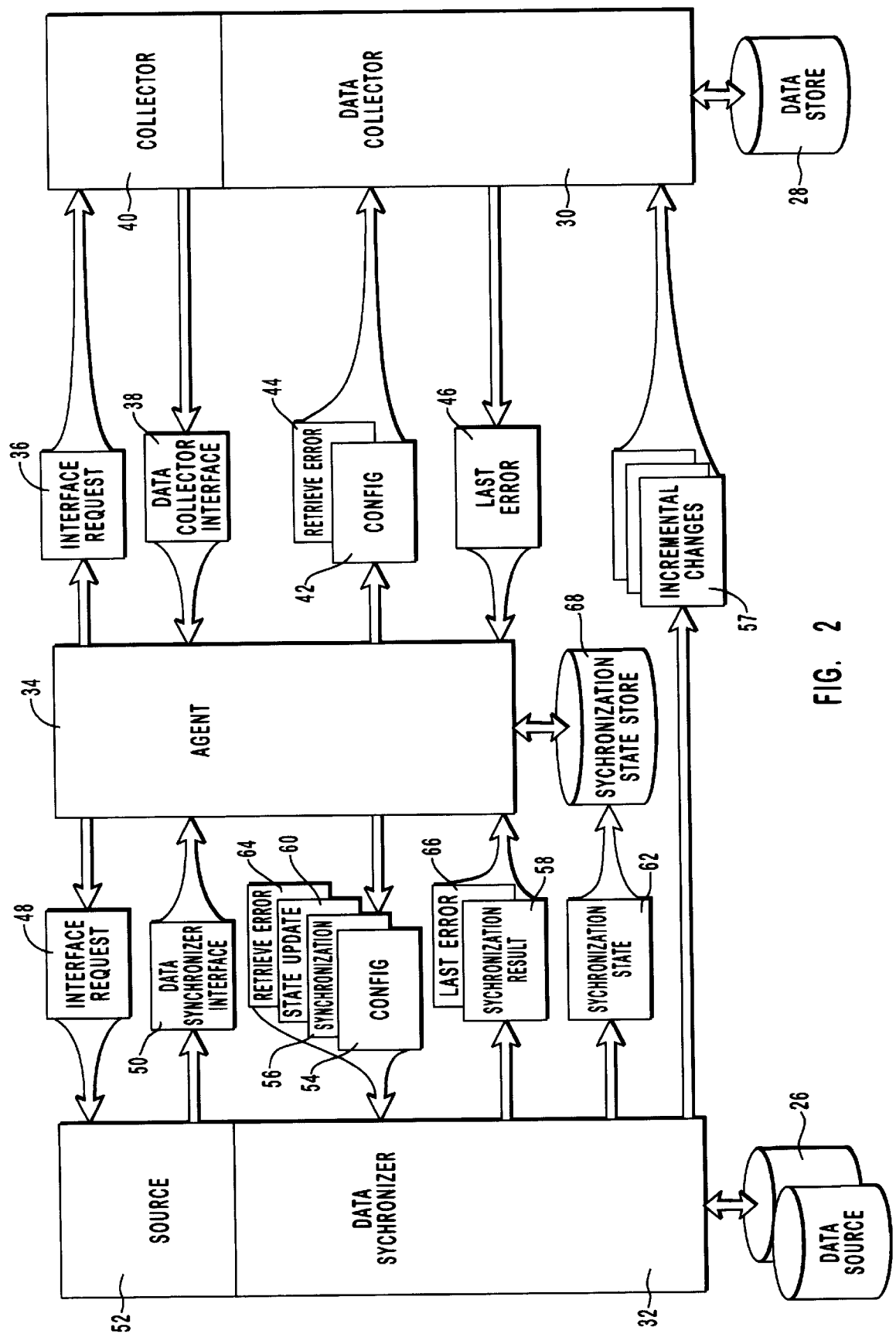
FIG. 2 is a diagram representing one embodiment of the present invention.

FIG. 2 presents a top level diagram of one embodiment of the present invention. This figure will be used to explain how data is tranferred using the present invention. Details of how to apply an embodiment such as that illustrated in FIG. 2 to the replication enterprise context of FIG. 1 are discussed below. As previously described, the present invention employs a one-way data flow model to transfer information from a data source to a data recipient. Thus, when the data source has changes made thereto that have not been made to the data recipient, then the changes may be transferred from the data source to the data recipient using the one-way data flow model of the present invention. In FIG. 2, data source 26 is presumed to have had changes made thereto that do not yet exist in data store 28. Thus, the data source is data source 26 and the data recipient is data store 28.

The present invention defines three functional components to implement the one-way data flow previously described. The three functional components are a means for collecting data transferred to the means for collecting, a means for synchronizing data, and a means for controlling transfer of changes from the means for synchronizing to the means for collecting. By way of example, and not limitation, in FIG. 2, these functional components are illustrated as data collector 30, data synchronizer 32, and agent 34 respectively. Although each of these functional components is explained in greater detail below, the basic purpose of each functional component may be summarized as follows. Data collector 30 is typically adapted to receive incremental changes from data synchronizer 32. Data collector 30 may be adapted to directly apply or store the received incremental changes in order to bring data store 28 current, or data collector 30 may be adapted to pass received incremental changes along to other functional components that are then responsible for further processing the received incremental changes.

Data synchronizer 32 is generally responsible for retrieving the incremental changes that need to be transferred to data collector 30 and transferring the appropriate incremental changes under the direction of agent 34. Data synchronizer 32 may also be adapted to update the synchronization state of data store 28 as described below.

Directing the synchronization process and performing appropriate control functions is agent 34. In general, agent 34 is responsible for making the connection between data collector 30 and data synchronizer 32 so that data synchronizer 32 can pass incremental changes directly to data collector 30. Agent 34 is also responsible for controlling data synchronizer and directing data synchronizer 32 to pass incremental changes to data collector 30 or to update the synchronization state. Agent 34 is also responsible for storing the synchronization state and for providing access to the synchronization state to data synchronizer 32 as described in greater detail below.

Although the full synchronization procedure is described in greater detail below, a general overview or summary of the synchronization procedure may be helpful. The basic synchronization procedure begins when agent 34 begins executing. Agent 34 may be initiated by a user or by another process executing on the system. In order to perform the synchronization procedure, the agent forms a connection between data collector 30 and data synchronizer 32. This connection allows data synchronizer 32 to pass information directly to data collector 30 without requiring agent 34 to pass the information from data synchronizer 32 to data collector 30. Many technologies exist to make such a connection and the technology selected will depend, in large part, on the particular implementation details of data collector 30, data synchronizer 32, and agent 34. In one embodiment, technology analogous to Microsoft's Component Object Model (COM) technology may be used. This technology defines a mechanism whereby a process may obtain an interface to an object or other process and then use that interface to communicate with the process or cause the object to perform certain functions. Information regarding this technology is widely available and is known to those of skill in the art. One embodiment implemented using this type of technology may make a connection between data collector 30 and data synchronizer 32 by first obtaining an interface to data collector 30 and then passing that interface to data synchronizer 32. Data synchronizer 32 may then use the interface to transfer incremental changes directly to data collector 30.

After the connection is formed between data collector 30 and data synchronizer 32, agent 34 directs synchronizer 32 to synchronize with data collector 30. This direction will cause data synchronizer 32 to pass incremental changes from data synchronizer 32 to data collector 30. Typically, data synchronizer 32 will only pass a portion of the incremental changes that need to be transferred to data collector 30 each time it is directed to synchronize. This allows agent 34 to track the progress of the synchronization process and also allows agent 34 to terminate the synchronization process at any point. As explained in greater detail below, this also allows agent 34 to checkpoint the process along the way so that it can be resumed at a particular point if desired.

Returning now to FIG. 2, the above synchronization process is described in greater detail. The one-way data flow model of the present invention uses an agent, such as agent 34, to direct data to be transferred from a data source to a data recipient. As summarized briefly above, this requires a connection to be made between data collector 30 and data synchronizer 32. Although several alternatives to making this connection have been discussed above, in FIG. 2, agent 34 requests an interface to data collector 30. This is illustrated in FIG. 2 by interface request 36. Data collector interface 38 is returned in response to the request. As illustrated in FIG. 2, this request is issued to collector 40. Collector 40 is a general representation of any process or object that can be used to obtain an appropriate interface to data collector 30. For example, if the data recipient was a synchronization client, then collector 40 may be a process running on the synchronization client, the operating system of synchronization client, or simply an internal function call used by agent 34 to obtain an interface to data collector 30.

Although the exact details of data collector interface 38 are unspecified by the present invention, the interface should contain at least one mechanism to allow data transfer directly to data collector 30. For example, data collector interface 38 may contain a function call that imports incremental changes into data collector 30. In addition, data collector interface 38 may contain a mechanism for using I/O streams to transfer incremental changes from data synchronizer 32 to data collector 30. As used herein, an I/O stream is a stream where information may be written to or read from in order to place data into the stream or remove data from the stream.

The data collector interface may also contain other functions such as functions that import message deletions, import message moves, import state information, fictions that allow errors to be retrieved and examined, and functions that allow configuration of various features of data collector 30. Agent 34 may utilize certain of these functions in order to configure data collector 30 or to retrieve errors. This is illustrated in FIG. 2 by configuration request 42, retrieve error request 44, and last error response 46. Typically, these will be implemented by function calls between agent 34 and data collector 30. Thus, to configure data collector 30, agent 34 will make an appropriate function call to the configuration function. Such a function call can be used to set any desired configuration parameters. Possible configuration parameters may include a "reject deletes" parameter that rejects changes that delete objects, and configuration parameters that deal with how changes are transferred to data collector 30. In order to retrieve the last error, agent 34 may make an appropriate function call to the retrieve last error function, which will then return the last error encountered.

Other functions may also be defined by the data collector interface. For example, the functions illustrated above are tailored specifically to transferring changes made to specific data objects, such as E-mail messages, word processing documents, spreadsheets, and so forth. However, other types of information may also be synchronized between a data source and a data collector. For example, a folder or directory hierarchy may be synchronized between a data source and a data collector. It may be desirable to provide specific functions on data collector interface 38 to import changes relating to the folder hierarchy. Such functions may be directed specifically to changes or deletions in the folder hierarchy. Other specific functions may be added to the data collector interface as appropriate according to the type of information that is to be synchronized between the data source and the data collector.

After agent 34 has obtained the data collector interface and configured data collector 30, agent 34 then obtains an interface from data synchronizer 32. This process is illustrated in FIG. 2 by interface request 48 and data synchronizer interface 50. In FIG. 2, this request is handled by source 52. Source 52 is a general representation of any object process that can be used to obtain a data synchronizer interface.

The data synchronizer interface may contain mechanisms to access appropriate functionality in data synchronizer 32. As previously explained, data synchronizer 32 needs to be connected to data collector 30. Thus, the data synchronizer interface will probably contain a mechanism to configure data synchronizer 32. For example, a function call may be used to pass appropriate configuration information to data synchronizer 32. Such configuration information can comprise, for example, the data collector interface or a handle that allows the data collector interface to be obtained, and filters in order to filter the types of incremental changes sent to data collector 30. Such filters may be used to restrict the incremental changes to those of interest to data collector 30. In some embodiments, the number of incremental changes contained in data source 26 may far exceed those of interest to data collector 30. Filters may be used to restrict incremental changes contained on a data source to those of interest to a data collector.

As described above, agent 34 may also be adapted to provide access to the synchronization state of the data recipient. Such a synchronization state may comprise, for example, those incremental changes already held by the data recipient. Such a synchronization state may comprise other information necessary or desirable to allow the synchronization to occur. For example, if translation tables are used to translate change numbers or other identifiers between systems, then it may be desirable to store such translation tables as part of the synchronization state. The configuration function may be an appropriate mechanism to provide access to such a synchronization state. For example, agent 34 may provide an I/O stream to data synchronizer 32 via the configuration function. This I/O stream will then allow data synchronizer 32 to access the synchronization state by reading from or writing to the I/O stream. If data synchronizer 32 has other parameters that can be configured, these may also be made part of the configuration function. For example, the mechanism used to communicate data to data collector 30 may be part of the configuration parameters. Thus, whether data collector 30 desires to receive information via an I/O stream or via function calls may be a parameter in the configuration function. In FIG. 2, the configuration process is illustrated by configuration request 54.

Generally, the two main functions of data synchronizer 32 are to pass incremental changes to data collector 30 and to provide an updated synchronization state reflecting the incremental changes transferred to data collector 30. Thus, the data collector interface will most likely have mechanisms to allow agent 34 to direct data synchronizer 32 to perform these two functions. In one embodiment, a mechanism to pass incremental changes from data synchronizer 32 to data collector 30 can be a "synchronize" function call. In FIG. 2, such a function call is illustrated by synchronization request 56. When agent 34 calls the synchronize function, data synchronizer 32 may pass at least a portion of the incremental changes to data collector 30. It is presently preferred that data synchronizer 32 only pass a limited number of incremental changes to data collector 30 with each synchronize call. This allows the synchronization progress to be returned to agent 34 with each group of incremental changes that are transferred to data collector 30 in response to a synchronize function call. Agent 34 can then decide what action should be taken. For example, agent 34 may checkpoint the synchronization process by directing data synchronizer 32 to update the synchronization state. This allows the synchronization process to be started from the point where the synchronization state has been updated. Such an approach also allows agent 34 to display the synchronization progress to a user or transfer the synchronization progress to another process. This approach also provides an opportunity for agent 34 to cancel the synchronization process at any point. Thus, a user may be given the option to exit out of the synchronization process before it is complete. In addition, the operating system may be given the option of gracefully terminating the synchronization process so that the process may be resumed at the point it terminated.

In order for data synchronizer 32 to receive direction to update the synchronization state, a mechanism may be provided in the data synchronizer interface to accomplish such an update. For example, data synchronizer interface 50 may contain an update state function that can be called by agent 34. Such a function call is illustrated in FIG. 2 by state update request 60. In response to such an update state call, data synchronizer 32 should update the synchronization state to reflect the incremental changes transferred to data collector. This is illustrated in FIG. 2 by synchronization state 62 being transferred to synchronization state store 68. Although FIG. 2 illustrates data synchronizer 32 directly updating synchronization state 62, data synchronizer 32 may also pass synchronization state 62 back to agent 34 and agent 34 can store synchronization state 62 in the appropriate location.

The interface to data synchronizer 32 may also provide a mechanism to retrieve errors that occur. This is illustrated in FIG. 2 by retrieve error request 64 and last error response 66. Such a mechanism may be implemented, for example, by a function call that allows agent 34 to request the last error from data synchronizer 32 and further allows data synchronizer 32 to return the error in response to the request. The interface to data synchronizer 32 may also contain other functions or mechanisms to access other functionality within data synchronizer 32 as appropriate for the particular implementation.

Although discussed in greater detail below, it may be helpful to summarize how the embodiment illustrated in FIG. 2 relates to a particular context, such as that illustrated in FIG. 1. By picking the appropriate descriptive language, we can see that the situations presented previously with regard to a general synchronization client and replication enterprise are related. Previous examples of synchronization clients were an incremental backup that wished to extract changes made within the replication enterprise, local storage of one or more objects replicated in the replication enterprise, inter-organizational replication, and a replication gateway where two different replication enterprises wished to synchronize data. In general, for all these scenarios, the agent process will reside on the synchronization client. Then, depending on whether information is to flow into or out of the replication enterprise, either the replication enterprise, the synchronization client, or both will implement one or more of the data synchronizer or the data collector.

In the incremental backup situation, the agent could be a backup program. The data source would be the replication enterprise so the replication enterprise would implement a data synchronizer. The information recipient would be the incremental backup device. Thus, the agent or backup program would make a connection between a data collector interface of the backup device and the data synchronizer interface of the replication enterprise. The agent could then direct incremental changes be transferred from the replication enterprise to the backup device.

In the case of a local copy of one or more objects replicated in the replication enterprise, the agent may be a process running on the local system. One data source would be the replication enterprise and one data recipient would be the local system. In this case, however, the local system may also make changes that need to be copied to the replication enterprise. Thus, the local system may also be a data source and the replication enterprise may also be a data recipient. Thus, both the local system and the replication enterprise would implement a data synchronizer and a data collector. The agent could first make a connection one-way and, after all changes have been transferred in that direction, make a connection in the opposite direction. The other situations may be addressed in a similar fashion. Note, however, the agent always or almost always resides on the synchronization client.

Figure 3:
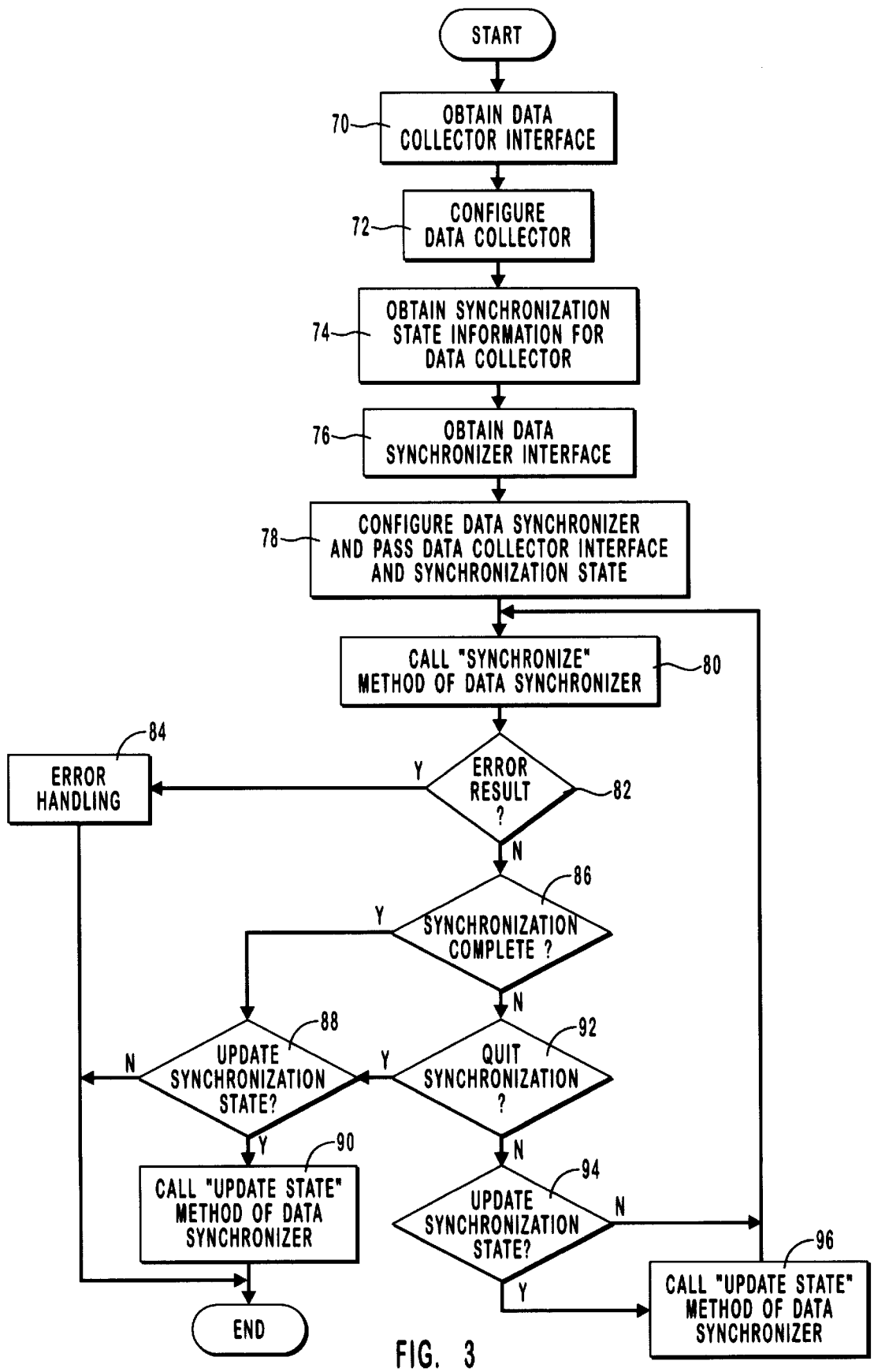
FIG. 3 contains one implementation of the agent block of FIG. 2.

Referring next to FIG. 3, one implementation of the functionality in agent 34 of FIG. 2 is presented. As illustrated in FIG. 3, in this implementation of agent 34, when agent 34 is initiated, the first step is to obtain a data collector interface. This is illustrated in FIG. 3 by step 70. As previously discussed, any mechanism to obtain an appropriate data collector interface may be used. In FIG. 3, this process was illustrated by agent 34 issuing interface request 36 and obtaining data collector interface 38 in response. Other mechanisms may also be used as long as an appropriate data collector interface is obtained. Rather than obtaining the interface directly, step 70 may also obtain a handle or other means whereby the data collector interface may be referenced and utilized.

After the data collector interface has been obtained, step 72 of FIG. 3 indicates that the data collector should then be configured. Any appropriate configuration information may be passed to the data collector at this step via its configuration mechanism in order to set the options and the configuration appropriately. Such options and configurations may include, for example, options to reject deletes that are passed to the data collector, options that set the mechanism by which incremental changes are sent to the data collector, and the like.

After the data collector has been configured, agent 34 obtains the synchronization state information for the data collector. This is illustrated in FIG. 3 by step 74. As discussed above, the synchronization state information contains information regarding the synchronization state of the data recipient. Such synchronization state information may comprise, for example, incremental changes that have been previously sent to and incorporated into the data recipient. Other appropriate information may also be contained within the synchronization state. Agent 34 may obtain the synchronization state information by retrieving the synchronization state from where it is stored or by opening an I/O stream that can be used to access the synchronization state. In the alternative, some embodiments may allow data collector 30 to save and store the synchronization state. Thus, agent 34 may obtain access to the synchronization state through data collector 30. Data collector 30 may retrieve the synchronization state and pass it to agent 34 or data collector 30 may open an I/O stream that can be used to access the synchronization state and pass the I/O stream to agent 34. All that is required is that agent 34 be able to provide access to the synchronization state to data synchronizer 32 as explained below.

Step 76 of FIG. 3 indicates that the next task is to obtain the data synchronizer interface. This was illustrated in FIG. 2 by interface request 48 and data synchronizer interface 50. As previously explained, any number of technologies may be used to gain access to data synchronizer 32. All that is required by this step is that agent 34 be able to access the underlying functionality of data synchronizer 32. The convenient metaphor for accessing this underlying functionality is through a data synchronizer interface.

After a data synchronizer interface has been obtained, the next step is to configure the data synchronizer. This is illustrated in FIG. 3 by step 78. In order to configure data synchronizer 32, it will be necessary to pass sufficient information to data synchronizer 32 to form a connection between data synchronizer 32 and data collector 30. This may be achieved, for example, by passing the data collector interface or a handle to the data collector interface to data synchronizer 32. This will allow data synchronizer 32 to access data collector 30 and transfer incremental changes to data collector 30. In order to allow data synchronizer 32 to update the synchronization state, the configuration process should also pass sufficient information to allow data synchronizer 32 to access the appropriate synchronization state. This may be accomplished, for example, by passing an I/O stream to data synchronizer 32 as previously explained. In the alternative, agent 34 may retrieve the appropriate synchronization state and pass the synchronization state to data synchronizer 32. All that is required is that data synchronizer 32 be able to access the information in the appropriate synchronization state in order to read from and write to the synchronization state.

At this point in FIG. 3, both the data collector and the data synchronizer have been configured and the connection between the data collector and the data synchronizer has been made. Thus, the next step is for agent 34 to direct data synchronizer 32 to begin synchronizing the data. As previously explained, this may be accomplished by agent 34 calling a synchronize function of data synchronizer 32. This is illustrated in FIG. 3 by step 80. As previously explained, it is preferred that data synchronizer 32 only transfer a designated number of incremental changes to data collector 30 with each synchronize call.

In many embodiments, the synchronize call will result in a synchronize status being returned to agent 34. This status may indicate the progress in the synchronization process (e.g., the percent complete or other measure), the success of the transfer, or the result may indicate that no incremental changes remain to be transferred. Decision block 82 of FIG. 3 tests whether this result indicates that an error occurred. If so, execution passes to step 84 where any appropriate error handling is performed. Execution of the agent may then terminate, or, if the error was handled appropriately, may resume at an appropriate point in the diagram of FIG. 3. If, however, an error did not occur then execution passes to decision block 86.

Decision block 86 tests whether the synchronization process is complete, that is, whether no more incremental changes remain to be transferred from data synchronizer 32 to data collector 30. If the synchronization process is complete, execution passes to decision block 88 where the agent decides whether the synchronization state should be updated. In general, it would always be desirable to update the synchronization state after successful completion in order to avoid retransferring incremental changes that have previously been transferred. However, certain circumstances may exist where an agent desires to exit without updating the synchronization state. This choice is illustrated in FIG. 3 by decision block 88. If the synchronization state should be updated, execution passes to step 90 where the synchronization state is updated. If the synchronization state should not be updated, execution terminates without updating the synchronization state.

As described above, one of the benefits of transferring a limited number of incremental changes with each synchronize call is the ability to display progress to a user and to terminate the synchronization process at any point. Decision block 92 of FIG. 3 tests whether the synchronization process should be terminated. If so, execution passes to decision block 88 where the process described above is followed. If the process is not to be terminated, execution proceeds to decision block 94.

Another advantage of transferring only a limited number of incremental changes with each synchronize call is the ability to checkpoint or update the synchronization state part way through the process. Decision block 94 tests whether the synchronization state should be updated. If so, execution proceeds to step 96 where the update state function of the data synchronizer is called. In any event, execution then proceeds back to step 80 where the synchronize function is called again. Thus, in the implementation in FIG. 3, the synchronize and update state functions are repeatedly called as appropriate until either all incremental changes have been transferred or until the process terminates either by error or by design.

Figure 4:
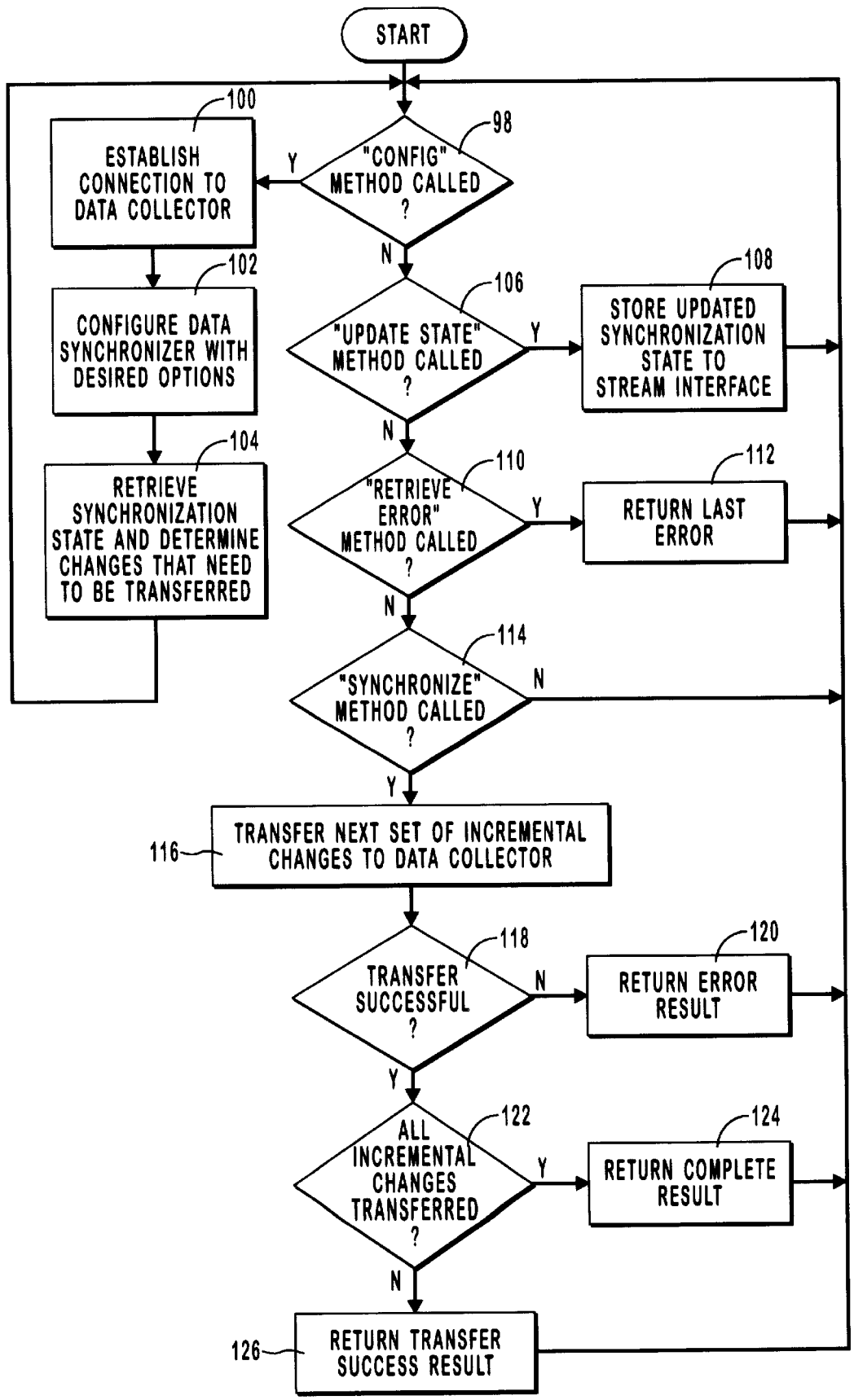
FIG. 4 contains one implementation of the data synchronizer block of FIG. 2.

Referring next to FIG. 4, one implementation of data synchronizer block 32 of FIG. 2 is presented. In FIG. 4, decision block 98 tests whether the configuration function of data synchronizer 32 has been called by agent 34. If so, execution then proceeds to step 100 where the connection between data synchronizer 32 and data collector 30 is established. This step may require nothing more than storing a handle to the data collector interface in an appropriate location. Alternatively, more processing or configuration may be necessary in order to establish the connection between data synchronizer 32 and data collector 30.

After the connection between data synchronizer 32 and data collector 30 has been created, step 102 indicates that the data synchronizer should then be configured with the appropriate options. This step is included to represent any processing that must be accomplished to configure the data synchronizer according to the parameters passed by agent 34. This may entail storing parameters in certain locations, setting flags, or any other type of processing that would be necessary to achieve the appropriate configuration.

Step 104 of FIG. 4 indicates that the final step in the configuration procedure is to retrieve the synchronization state and determine the incremental changes that need to be transferred to data collector 30. It is anticipated that in many, if not most, implementations of the present invention, that synchronizer 32 would be tasked with determining which incremental changes need to be transferred to data collector 30. This is due to several factors. One of the benefits of the present invention is that all synchronization state information is stored with the agent or data collector rather than with the data synchronizer. The benefits of this architecture may be highlighted by considering a simple example. Consider a mobile synchronization client that desires to synchronize with a replication enterprise as explained in conjunction with FIG. 1. In such a situation, a user would want to connect the mobile system to the replication enterprise and then direct that synchronization should occur or have synchronization occur automatically in the background. This means that the most likely place for the agent to reside will be on the synchronization client. Thus, all synchronization state information will also be stored on the synchronization client. This eliminates the need for the replication enterprise to store any synchronization information regarding the various synchronization clients. This greatly simplifies administration of the replication enterprise and does not greatly burden the synchronization client.

Another implication of this architecture is that the agent does not need to understand anything about the format of the synchronization state. The agent can retrieve the synchronization state, pass it to the data synchronizer, which can then examine the synchronization state in order to extract the desired information. When the synchronization state is updated, the synchronization state may be passed back to the agent which stores it appropriately.

Returning now to FIG. 4, because the synchronization state is stored in a format that is understood by data synchronizer 32, it makes sense to task data synchronizer 32 with the responsibility for determining which of the incremental changes need to be transferred to data collector 30. This is illustrated in FIG. 4 by step 104. After step 104 has been performed, execution returns to the start to await the next command from agent 34.

If the configuration function was not detected at decision block 98, execution would proceed to decision block 106 which determines if the update state function has been called. If so, execution proceeds to step 108 where the synchronization state is updated. As previously described, this may be accomplished by writing to an I/O stream or by passing an updated synchronization state to agent 34. Other mechanisms may also be used as long as an appropriate updated synchronization state is saved.

If the update state function was not detected at decision block 106, execution proceeds to decision block 110 where the retrieve error function is tested. If agent 34 called the retrieve error function, execution proceeds to step 112 where the last error is returned to agent 34. Agent 34 can then act on the error as appropriate.

If the retrieve error function was not detected by decision block 110, then execution proceeds to decision block 114 where data synchronizer 32 determines whether the synchronize function has been called by agent 34. Strictly speaking, decision block 114 may not be necessary if agent 34 only calls valid functions.

The first step performed when the synchronize function is called is to transfer the next set of incremental changes to the data collector. This is illustrated in FIG. 4 by step 116. As explained in several places above, it is preferred that only a limited number of incremental changes are transferred each time the synchronize function is called. This limited number may be determined based on a strict number or may be determined by a particular size. Thus, each time the synchronize function is called, a certain number of incremental changes may be transferred or the transfer may be limited to a fixed number of bytes. This is considered to be an implementation detail and is not important for purposes of this invention.

After the next set of incremental changes has been transferred to the data collector, decision block 118 tests whether the transfer was successful. If the transfer was not successful, execution proceeds to step 120 which indicates that an error result should be returned to agent 34. If, however, the transfer was successful, then execution proceeds to decision block 122.

Decision block 122 tests whether all appropriate incremental changes have been transferred to data collector 30. If so, execution proceeds to step 124 where an indication is returned to agent 34 that the synchronization process is complete. If, however, all incremental changes have not yet been transferred, then execution proceeds to step 126 which returns a successful transfer indication and execution proceeds back to the start to await the next function call from agent 34.

Figure 5:
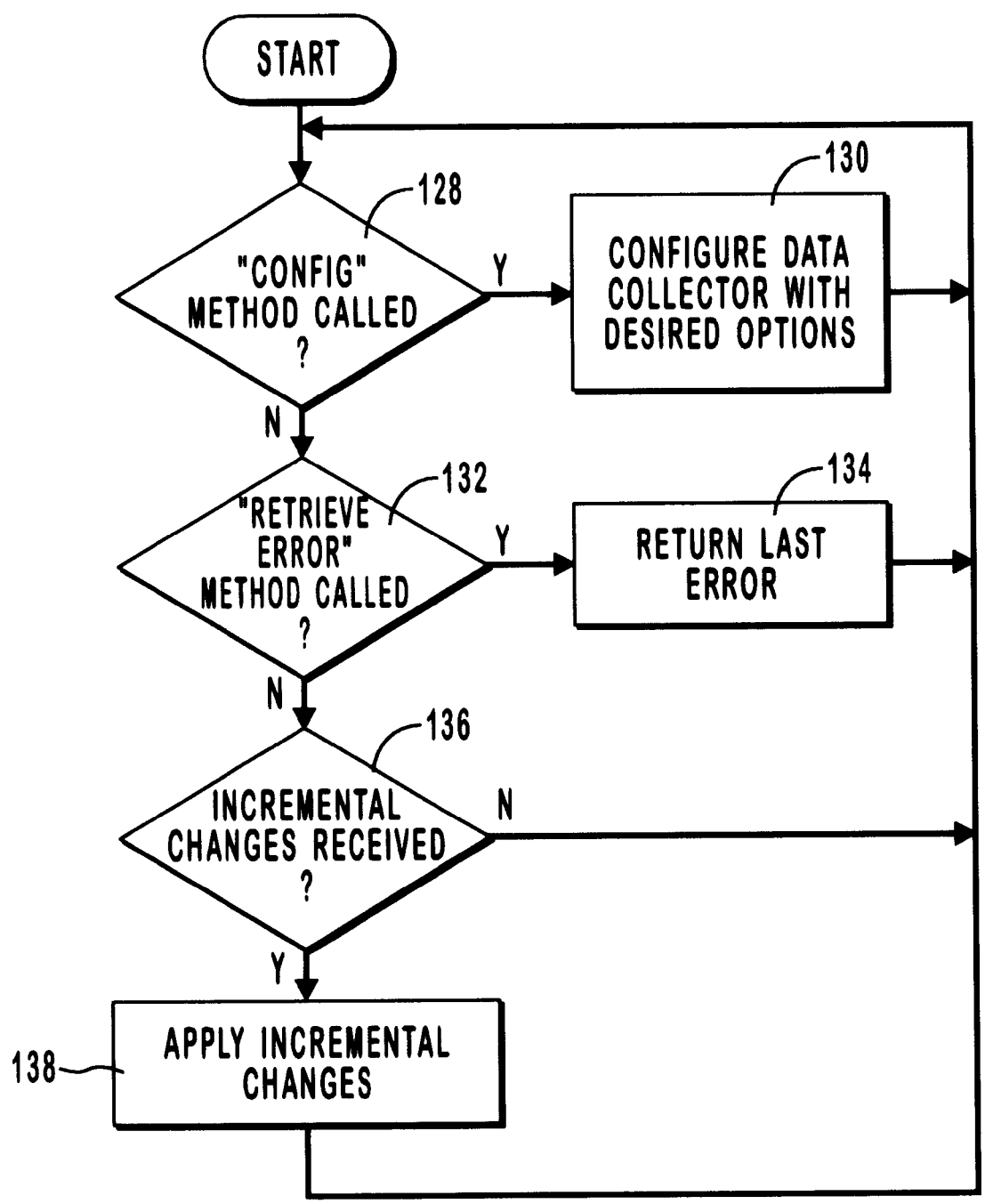
FIG. 5 contains one implementation of the data collector block of FIG. 2.

Referring next to FIG. 5, one implementation of the processing of data collector 30 is presented. In FIG. 3, decision block 128 tests whether the configuration function of data collector has been called. If so, execution proceeds to step 130 where the data collector is configured with the desired options. Examples of configuration of a data collector have been presented previously.

Decision block 132 of FIG. 5 determines whether a retrieve error function has been called. If so, execution proceeds to step 134 where the last error is returned in response to the function call.

Decision block 136 tests whether incremental changes have been received from a data synchronizer. If so, step 138 indicates that such incremental changes should be applied. As previously explained, when incremental changes are received, data collector 30 may apply the incremental changes in order to bring the data store, such as data store 28 of FIG. 2, current with respect to that incremental change. In the alternative, incremental changes may be saved unchanged. As still another example, incremental changes may be passed to another processing block for further action. In FIG. 5, step 138 may appropriately incorporate any of these functions. Step 138 is designed to generally represent that the incremental changes are processed according to a designated processing strategy.

One of the benefits of the present invention is that it defines a synchronization model that can be extended in a variety of ways to accommodate a wide variety of situations. The ability to accommodate various types of synchronization clients has been previously illustrated. The present invention may, however, also be extended to cover synchronization over a transport link rather than via a direct connection as illustrated in FIG. 2. An embodiment illustrating extension of the concepts presented in FIG. 2 to synchronization over a transport link is presented in FIGS. 6A and 6B. Embodiments that utilize a transport link for synchronization may comprise means for controlling transfer of incremental changes. In FIG. 6B, such means for controlling is illustrated, for example, by agent 140. Agent 140 corresponds roughly to agent 34 of FIG. 2B. That is, agent 140 is responsible, among other things, for controlling the overall synchronization procedure. Agent 140 also controls local operation of the synchronization process by controlling transport synchronizer 142 as described in greater detail below.

Embodiments using a transport link to synchronize data may also comprise means for synchronizing data. In FIG. 6B, such means for synchronizing data is illustrated, for example, by transport synchronizer 142. Transport synchronizer 142 fills a role somewhat analogous to data synchronizer 32 of FIG. 2 with some differences as explained in greater detail below.

Embodiments within the scope of this invention also comprise means for collecting incremental changes transferred to said means for collecting. By way of example, and not limitation, in FIG. 6B such means for collecting is illustrated by data collector 144. Data collector 144 performs a function analogous to data collector 30 of FIG. 2 previously discussed.

Figure 6A:
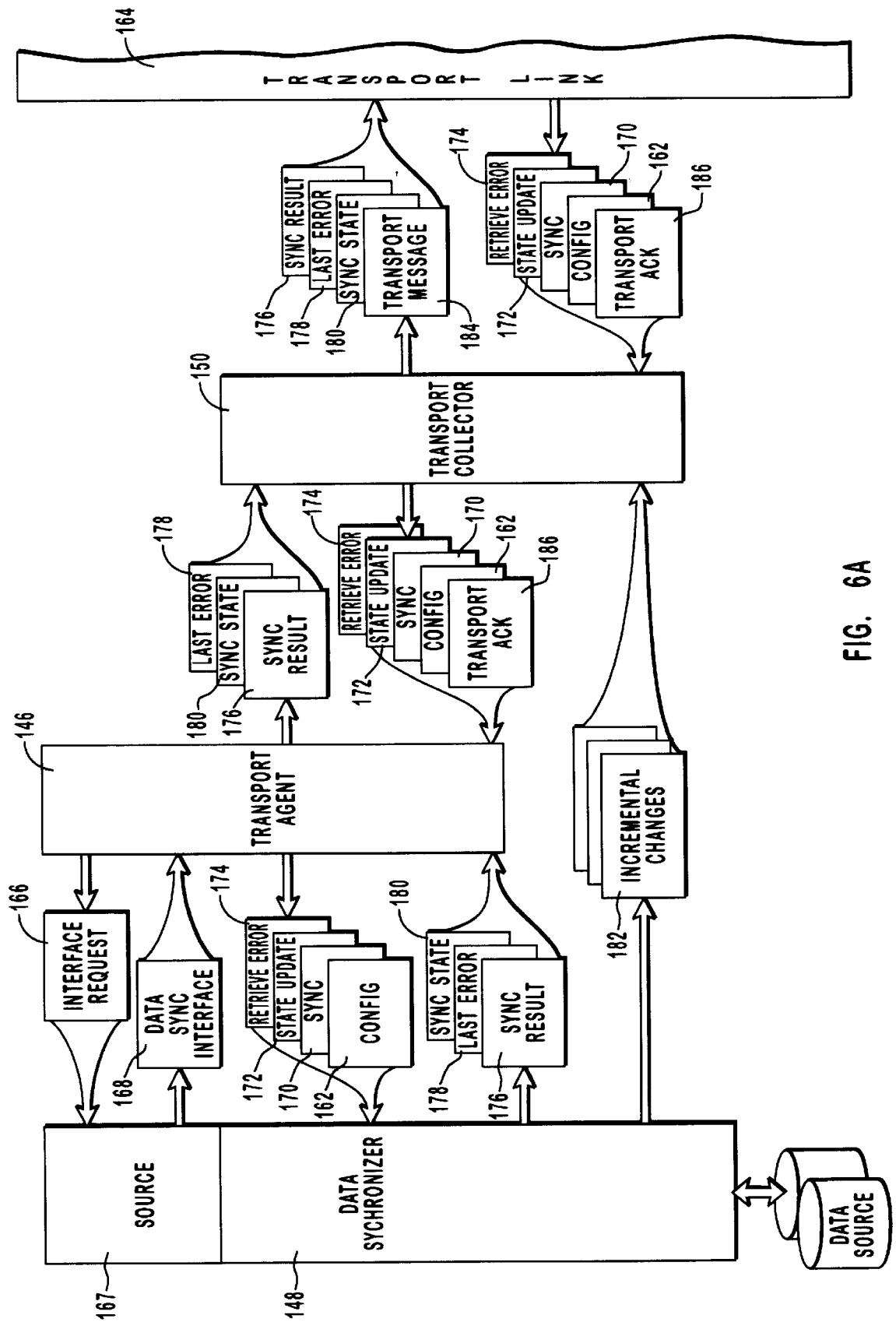
FIGS. 6A and 6B illustrate one embodiment of the present invention that allows synchronization across a transport link.
Figure 6B:
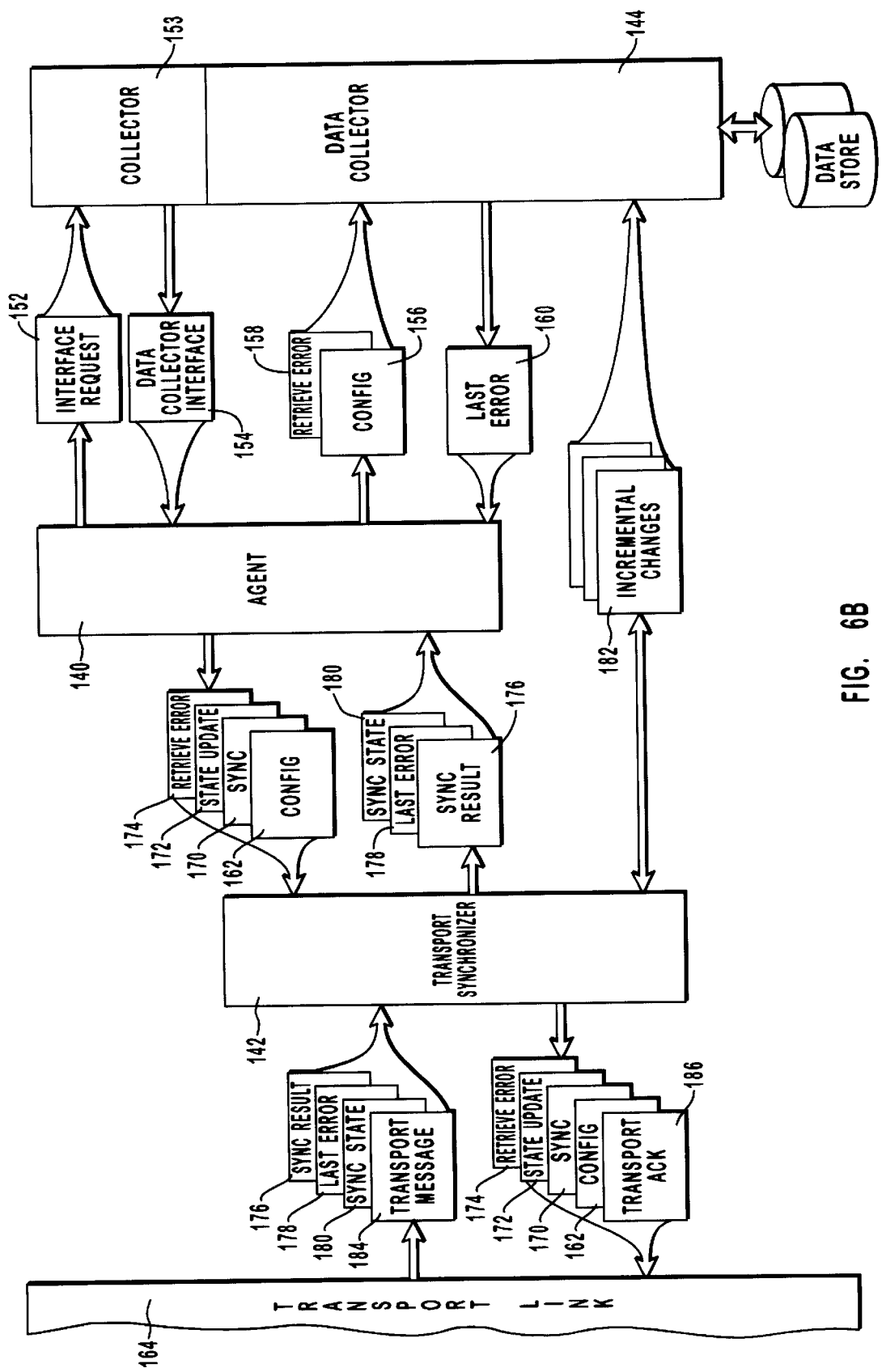

Referring for a moment to FIG. 6A, embodiments that use a transport link may also comprise transport agent 146, data synchronizer 148 and transport collector 150. Transport agent 146 is yet another example of means for controlling transfer of incremental changes, data synchronizer 148 is yet another example of means for synchronizing data, and transport collector 150 is another example of means for collecting incremental changes.

The embodiment illustrated in FIGS. 6A and 6B operate similar to the embodiment illustrated in FIG. 2 with the differences explained below. In principal, agent 140 corresponds to agent 34 of FIG. 2, data collector 144 corresponds to data collector 30 of FIG. 2 and data synchronizer 148 corresponds to data synchronizer 32 of FIG. 2. In order to allow these components to function substantially the same as they do in the embodiment illustrated in FIG. 2, transport collector 142 is added to interface with agent 140 and 144 and transport agent 146 and transport collector 150 are added to interface with data synchronizer 148. Operation of the embodiment illustrated in FIGS. 6A and 6B may then proceed as follows.

Agent 140 initiates the synchronization process by requesting a data collector interface and receiving the data collector interface as illustrated by interface request 152 and data collector interface 154 of FIG. 6B. Agent 140 can configure data collector 144 via configuration call 156 as previously described. Furthermore, errors may be retrieved from data collector 144 via retrieve error request 158 and last error response 160. All this can operate substantially as previously explained in connection with FIG. 2.

Agent 140 may then configure transport synchronizer 142 and data synchronizer 148 of FIG. 6A. This may be accomplished through configuration request 162. As illustrated in FIG. 6B, configuration request 162 may be sent to transport synchronizer 142. This configuration request may configure transport synchronizer 142. If, however, the configuration request is for data synchronizer 148 of FIG. 6A, then transport synchronizer 142 may forward configuration 162 across transport link 164 to transport collector 150 of FIG. 6A. Such a configuration request may be forwarded by transport collector 150 to transport agent 146. Transport agent 146 may then obtain a data synchronizer interface via interface request 166 and data synchronizer interface 168 substantially as explained in conjunction with FIG. 2. After the data synchronizer interface has been obtained, transport agent 146 may make the appropriate configuration call as indicated by configuration call 162 of FIG. 6A.

Note that due to the structure presented in FIGS. 6A and 6B, source 167 of FIG. 6A and collector 153 of FIG. 6B do not need to be modified to work across transport link 164. It may, however, be necessary to modify the configuration message sent to data synchronizer 148 in one respect. Since data synchronizer 148 will be sending incremental changes to transport collector 150 instead of directly to data collector 144, transport agent 146 must establish a connection between data synchronizer 148 and transport collector 150. Similarly, agent 140 of FIG. 6B must establish a connection between transport synchronizer 142 and data collector 144 so that incremental changes received over transport link 164 may be forwarded by transport synchronizer 142 to data collector 144.

As indicated in FIG. 6B, agent 140 can make synchronization call 170, state update call 172, and retrieve error call 174 substantially the same as in FIG. 2. As indicated in FIGS. 6B and 6A, requests to make these calls may be passed by transport synchronizer 142 over transport link 164, through transport collector 150 to transport agent 146. These may be translated into the appropriate calls for data synchronizer 144 by transport agent 146 as indicated in FIG. 6A. Similarly, synchronization result 176, and last error 178 may be returned as indicated in FIGS. 6A and 6B.

In some embodiments, however, modifications of the basic operation for these calls and results may be warranted. For example, if transport link 164 is an E-mail transport link where rapid bidirectional communication is not generally available, then certain modifications may be appropriate. For example, agent 140 may send a begin synchronization message to transport agent 146 which then begins making repeated synchronization calls to data synchronizer 148. These cause incremental changes to be transmitted through transport collector 150, transport synchronizer 142, to data collector 144. This would provide substantially autonomous operation for transport agent 146 and data synchronizer 148 while still retaining ultimate synchronization control in agent 140. Agent 140 could then stop the process by sending a stop synchronization request in a similar fashion. Furthermore, the state update request may be a request by agent 140 to have transport agent 146 update the synchronization state every few synchronization calls. In other words, it may be desirable to employ means to configure transport agent 146 for essentially autonomous operation while maintaining the ability to receive command or control messages from agent 140.

Performing synchronization over transport link 164 will also likely cause modification in how the synchronization state is accessed and updated. In conjunction with FIG. 2 it was explained that access may be provided to the synchronization state in a variety of ways. One way was to open an I/O stream that could then be passed to the data synchronizer. Transport link 164 will generally prohibit such a mechanism. It would likely be required that agent 140 retrieve the appropriate synchronization state and pass the synchronization state via transport synchronizer 142 and transport collector 150 to transport agent 146. Transport agent 146 would then likely have to be responsible for checkpointing the synchronization process and saving a series of synchronization states which are then passed back to agent 140. This is indicated in FIGS. 6A and 6B by synchronization state 180.

Modifications in how incremental changes are passed are also required. In general, transport agent 146 of FIG. 6A will be responsible for making synchronization calls to data synchronizer 148. In response to the call, data synchronizer 148 will pass incremental changes 182 to transport collector 150. Transport collector 150 will then package incremental changes 182 into transport message 184 which is sent, via transport link 164, to transport synchronizer 142. Transport synchronizer 182 would then forward incremental changes 182 to data collector 144 as illustrated in FIG. 6B.

If transport link 164 does not provide rapid bidirectional communication, then messages sent across transport link 164 will need to be acknowledged. Although the following discussion is presented in conjunction with incremental changes 182, a similar procedure may be used to ensure reception of any of the previous messages described in conjunction with the embodiment illustrated in FIGS. 6A and 6B. Because it is important to ensure that as incremental changes are sent across transport link 16, they are appropriately received at the other end, transport collector 150 and transport synchronizer 142 may be configured to pass and receive acknowledgements to messages sent across transport link 164. For example, as incremental changes 182 are packaged into transport message 184 and sent across transport link 164 to transport synchronizer 142, if the transport message is received without error, transport synchronizer 142 can send transport acknowledge message 186 back across transport link 164 to transport collector 150. Such a transport acknowledgement may then be passed to transport agent 146. Transport agent 146 may then track those incremental changes that have been sent and those incremental changes that have been acknowledged as received. This way, transport agent 146 can ensure that all appropriate incremental changes are sent and properly received.

If transport agent 146 does not receive appropriate acknowledgement for one or more incremental changes sent to data collector 144, then transport agent 146 can request that data synchronizer 148 resend the appropriate incremental changes. Transport agent 146 must also ensure that the synchronization state is updated appropriately as incremental changes are acknowledged. This may require transport agent 146 saving a series of synchronization states and restarting data synchronizer 148 at an appropriate synchronization state when one or more incremental changes are unacknowledged.

In FIGS. 6A and 6B, transport link 164 is intended to represent a general transport mechanism. Thus, transport link 164 is an example of transport link means for transporting information between a data sender and data receiver. Such transport link means may be any type of transport mechanism such as a LAN, WAN, E-mail transport, or other type of transport mechanism.

The general synchronization model presented herein whether from an embodiment analogous to that disclosed in FIG. 2 or that disclosed in FIGS. 6A and 6B, allow synchronization between data stored in different formats. Thus, the data synchronizer may store information in one format while the data collector may store information in a different format. Thus, the present invention is highly useful when synchronizing data between two different types of systems or two different types of replication enterprises. The generalized synchronization model presented in this application does not impose significant restrictions on the types of systems that may be synchronized using the present model. Essentially, all that is required is the ability to ensure that an incremental change can be identified as common on both the source side and on the collector side and the ability to identify a particular data object as common on both the source side and the collector side. Thus, if an incremental change is passed from the source to the collector, the source and the collector should be able to identify the particular incremental change that has been transferred. Similarly, if a change is applied to a particular data object, both the source and the collector should be able to identify the particular data object.

When the present invention is used to allow connection into a store and forward replication enterprise, such as that disclosed in the Store and Forward Patent, previously incorporated by reference, it is required that any incremental changes passed from a synchronization client into the store and forward replication enterprise be identified by an ID value that comprises a globally unique ID (GUID) followed by a sequence number that is allocated in an increasing fashion so that sequence numbers allocated later in time have a larger value than sequence numbers allocated earlier in time. More information about GUID values and how they are generated can be found in the Store and Forward Patent, previously incorporated by reference. Essentially, however, a GUID is a 16 bytes value that uniquely identifies a source of a data object, change and so forth. Any method of generating a GUID will work as long as the generated ID is unique in the enterprise and among all synchronization clients. One method of generating GUID values is available from Microsoft and is contained in the Windows 32 bit software development kit (WIN32SDK) as a program called UUIDGEN.

Such a function can best be achieved by the synchronization client using at least the sequence numbers to identify incremental changes internally. The data synchronizer that transfers incremental changes to the replication enterprise may then prepend each sequence number with an appropriate GUID value prior to transferring the incremental change to the replication enterprise.

In addition to assigning change numbers as previously discussed, synchronization clients wishing to interface with a store and forward replication enterprise, such as that disclosed in the Store and Forward Patent, must also identify each folder or data object in a similar fashion. The format must be a GUID value followed by a string of bytes. The GUID value is one generated by the creating entity. Thus, if the object was originally created in the store and forward replication enterprise then the original GUID assigned during creation must be maintained (possibly in a translation table or other mechanism). On the other hand, if the object was created by the synchronization client, then the GUID value is one generated by the synchronization client. The string of bytes can be generated via any algorithm that generates a unique string of bytes. Again, however, the string of bytes is generated by the creating entity. Thus, objects created within the replication enterprise must maintain their unique string of bytes. Objects created by the synchronization client may use any unique string of bytes desired by the synchronization client.

In the preceding discussion, attention was given to the one-way data flow model of the present invention. However, in many situations changes must flow both from the replication enterprise to the synchronization client and from the synchronization client to the replication enterprise. This may be accomplished by establishing a one-way link first in one direction and then establishing a one-way link in the other direction. For example, when a synchronization client connects to a replication enterprise, the agent on the synchronization client may first establish a one-way link from the replication enterprise to the synchronization client. The agent on the synchronization client can then synchronize changes from the replication enterprise to the synchronization client. After all such incremental changes have been received, the agent on the synchronization client may store an updated synchronization state for the synchronization client.

The agent on the synchronization client may then establish a one-way data flow path from the synchronization client into the replication enterprise. This would be accomplished by obtaining a data collector interface from the replication enterprise and connecting it to a synchronizer from the synchronization client. The agent on the synchronization client could then transfer changes from the synchronization client into the replication enterprise. After all such changes had been transferred, the agent could then save an updated synchronization state for the replication enterprise. Thus, to transfer changes in both directions, a one-way link is established first in one direction and then in the opposite direction by the same agent process. Obviously for synchronization clients that only desire to extract information from or add information into a replication enterprise there is no need to establish a data flow path in the opposite direction.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a non-integral node of a replication network that also includes an integral node, a method of synchronizing a second copy of data stored at the non-integral node with a first copy of data that is stored at the integral node and has had new incremental changes made thereto that are not yet incorporated into said second copy without transmitting the entire first copy to the non-integral node, said method comprising the steps of:

maintaining the second copy at the non-integral node, which is capable of communicating with the replication network;

storing, at the non-integral node, synchronization state information containing information regarding the synchronization state of the second copy, the synchronization state information including information identifying incremental changes already held in the second copy;

initiating execution of an agent process at the non-integral node, the agent process being adapted for controlling transfer of new incremental changes from said first copy stored at the integral node to said second copy by controlling a data synchronizer at the replication network, the data synchronizer being adapted for transferring incremental changes from said first copy;

said agent process sending the synchronization state information to said data synchronizer;

said agent process directing said data synchronizer to transfer said new incremental changes from said first copy to said second copy;

receiving and applying, at the non-integral node, the new incremental changes transferred from the data synchronizer without receiving said incremental changes already held in the second copy, so as to synchronize the second copy with the first copy, the new incremental changes having been identified by the data synchronizer by comparing the synchronization state information sent to the data synchronizer with information identifying incremental changes included in the first copy; and receiving, at the non-integral node, updated synchronization state information sent from the data synchronizer, the updated synchronization state information reflecting the new incremental changes that have been transferred to the second copy.

2. A method of synchronizing a second copy of data with a first copy of data as recited in claim 1 further comprising the step of said agent process making a connection between said data synchronizer and a data collector at the non-integral node, the data collector being adapted for receiving said new incremental changes from said data synchronizer and for making said received incremental changes part of said second copy, said connection allowing said new incremental changes to be transferred from said data synchronizer to said data collector.

3. A method of synchronizing a second copy of data with a first copy of data as recited in claim 1 wherein the step of said agent process sending the synchronization state information comprises the step of the agent process passing an I/O stream to said data synchronizer that allows said data synchronizer to access said synchronization state information by reading and writing information to said I/O stream.

4. A method of synchronizing a second copy of data with a first copy of data as recited in claim 1 wherein said first copy has a first data format and said second copy has a second data format different from the first data format, the method further comprising the step of storing said new incremental changes in said second copy in said second data format.

5. A method of synchronizing a second copy of data with a first copy of data that has had new incremental changes made thereto that are not yet incorporated into said second copy, said method comprising the steps of:

maintaining the first copy at an integral node of a replication network;

maintaining the second copy at a non-integral node that is capable of communicating with the replication network;

storing, at the non-integral node, synchronization state information containing information regarding the synchronization state of the second copy, the synchronization state information including information identifying incremental changes already held in the second copy;

initiating execution of an agent process at the non-integral node, the agent process being adapted for controlling transfer of new incremental changes from said first copy to said second copy by controlling a data synchronizer at the replication network, the data synchronizer being adapted for transferring incremental changes from said first copy;

said agent process sending, to said data synchronizer, the synchronization state information stored at the non-integral node;

based on a comparison between the synchronization state information and information identifying incremental changes included in the first copy, said data synchronizer determining the new incremental changes to be transferred from said first copy to said second copy;

said data synchronizer, being directed by the agent process, transferring at least a portion of said new incremental changes from said first copy to said second copy without transferring the incremental changes already held in the second copy, so as to synchronize the second copy with the first copy; and the data synchronizer updating the synchronization state information to reflect the new incremental changes being transferred to the second copy and transferring the updated synchronization state information to the non-integral node.

6. A method of synchronizing a second copy of data with a first copy of data as recited in claim 5 wherein the step of said agent process sending said synchronization state information comprises the step of said agent process passing an I/O stream to said data synchronizer that allows said data synchronizer to access to said synchronization state information by reading and writing information to said I/O stream.

7. A method of synchronizing a second copy of data with a first copy of data as recited in claim 5 further comprising the step of said agent process making a connection between said data synchronizer and a data collector at the non-integral node, the data collector being adapted for receiving said new incremental changes from said data synchronizer and for making said received changes part of said second copy, said connection allowing said new incremental changes to be transferred from said data synchronizer to said data collector.

8. A method of synchronizing a second copy of data with a first copy of data as recited in claim 7, wherein the step of the data synchronizer updating the synchronization state is conducted in response to said agent process directing said data synchronizer to update said synchronization state information so that said synchronization state reflects the transfer of said at least a portion of said new incremental changes.

9. A method of synchronizing a second copy of data with a first copy of data as recited in claim 8 wherein said data synchronizer updates said synchronization state information by writing updated synchronization state information to an I/O stream passed to said data synchronizer by said agent process.

10. A method of synchronizing a second copy of data with a first copy of data as recited in claim 8 further comprising the step of said agent process repeatedly directing said data synchronizer to transfer incremental changes to said data collector so that each time said data synchronizer is directed to transfer incremental changes, a further portion of said new incremental changes are transferred to said data collector, said agent process repeatedly directing said data synchronizer to transfer incremental changes until either all new incremental changes have been transferred to said data collector or until said agent process is directed to stop synchronizing data.

11. A method of synchronizing a second copy of data with a first copy of data as recited in claim 10 further comprising the step of said data collector receiving incremental changes transferred from said data synchronizer and applying said received incremental changes to said second copy in order to synchronize said second copy with said first copy as said agent process repeatedly directs said data synchronizer to transfer said incremental changes.

12. A method of synchronizing a second copy of data with a first copy of data as recited in claim 10 wherein said first copy has a first data format and said second copy has a second data format different from said first data format, the method further comprising the step of storing said received incremental changes in said second copy in said second data format.

13. A computer-readable medium having computer-executable instructions comprising for implementing, at a non-integral node capable of communicating with a replication network, a method of synchronizing a second copy of data stored at the non-integral node with a first copy of data that is stored at an integral node of the replication network and has had new incremental changes made thereto that are not yet incorporated into said second copy without the entire first copy being transmitted to the non-integral node, the computer-executable instructions comprising:

means for maintaining the second copy at the non-integral node;

means for storing, at the non-integral node, synchronization state information containing information regarding the synchronization state of the second copy, the synchronization state information including information identifying incremental changes already held in the second copy;

means for sending the synchronization state information from the non-integral node to a synchronization means for synchronizing data, the synchronization means operating at the integral node, where the first copy is stored;

means for collecting said new incremental changes having been transferred from the synchronization means to the non-integral node without collecting said incremental changes already held in the second copy, the new incremental changes having been identified by the synchronization means by comparing the synchronization state information that has been sent to the synchronization means with information identifying incremental changes included in the first copy;

means for controlling transfer of said new incremental changes from said synchronization means so that said synchronization means transfers said new incremental changes to said means for collecting under the direction of said means for controlling;

means for receiving, from the synchronization means, an update of synchronization state information reflecting the synchronization state of said second copy of data; and means for storing said update at the non-integral node.

14. A computer-readable medium as recited in claim 13 wherein said means for collecting is further adapted for processing said transferred incremental changes according to a designated processing strategy so that said transferred incremental changes are incorporated into said second copy.

15. A computer-readable medium as recited in claim 14 wherein said transferred incremental changes are incorporated into said second copy by applying said transferred incremental changes to said second copy to bring said second copy current with said transferred incremental changes.

16. A computer-readable medium as recited in claim 15 wherein said transferred incremental changes are incorporated into said second copy by storing said transferred incremental change in said second copy.

17. A computer-readable medium as recited in claim 13 wherein said means for sending operates by passing an I/O stream to said synchronization means so that said synchronization means can access said synchronization state information by reading or writing data to said I/O stream.

18. A computer-readable medium as recited in claim 13 wherein said means for controlling is further adapted for forming a connection between said means for collecting and said synchronization means so that said synchronization means can transfer said new incremental changes using said connection.

\* \* \* \* \*

UNITED STATES PATENT AND TRADEMARK OFFICE
CERTIFICATE OF CORRECTION

PATENT NO. : 6,202,085 B1
DATED : March 13, 2001
INVENTOR(S) : Max L. Benson, Dinarte Morais, Scott Norin, William P. Champion, Thomas F. Fakes and Milind M. Joshi It is certified that error appears in the above-identified patent and that said Letters Patent is hereby corrected as shown below:

<u>Title page,</u>
ABSTRACT,
Line 3, after "synchronization a" change "genera" to -- general --

<u>Column 5,</u>
Line 38, after "data" change "synchronizer" to -- collector --

<u>Column 6,</u>
Line 45, after "these" change "drawing" to -- drawings --

<u>Column 7,</u>
Line 35, before "simply" delete [s]

<u>Column 11,</u>
Line 1, after "information" change "fictions" to -- functions --

<u>Column 24,</u>
Line 28, after "access" delete [to]

<u>Column 26,</u>
Line 26, after "claim" change "15" to -- 14 --

Signed and Sealed this

Twenty-fifth Day of June, 2002

Attest:

JAMES E. ROGAN
*Attesting Officer*  *Director of the United States Patent and Trademark Office*